US011936824B2

(12) United States Patent
Matsumoto

(10) Patent No.: US 11,936,824 B2
(45) Date of Patent: Mar. 19, 2024

(54) IMAGE FORMING APPARATUS

(71) Applicant: CANON KABUSHIKI KAISHA, Tokyo (JP)

(72) Inventor: Akira Matsumoto, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 337 days.

(21) Appl. No.: 17/518,419

(22) Filed: Nov. 3, 2021

(65) Prior Publication Data

US 2022/0150372 A1 May 12, 2022

(30) Foreign Application Priority Data

Nov. 10, 2020 (JP) ................................ 2020-187420

(51) Int. Cl.
*H04N 1/04* (2006.01)
*H04N 1/00* (2006.01)
*H04N 1/10* (2006.01)

(52) U.S. Cl.
CPC ..... *H04N 1/00543* (2013.01); *H04N 1/00557* (2013.01); *H04N 1/00559* (2013.01); *H04N 1/0057* (2013.01); *H04N 1/1061* (2013.01)

(58) Field of Classification Search
None
See application file for complete search history.

(56) References Cited

U.S. PATENT DOCUMENTS

2006/0000056 A1* 1/2006 Connors ............ H04N 1/00554 16/65
2019/0208067 A1* 7/2019 Tsuchiya ............ G03G 21/1628

FOREIGN PATENT DOCUMENTS

JP 61055660 A * 3/1986 ......... G03G 21/1633
JP 07090872 A * 4/1995
JP 2002-223335 A 8/2002

* cited by examiner

*Primary Examiner* — Cheukfan Lee
(74) *Attorney, Agent, or Firm* — Canon U.S.A., Inc. I.P. Division

(57) ABSTRACT

An image forming apparatus includes an image reading device, a holding member that is rod-like, and an image forming device having an image forming unit that forms an image on a sheet, and having a wall part having a hole. The image reading device reads an image on a document, is provided on the image forming device, and rotates around a rotation shaft openable and closable with respect to the image forming device. The holding member has one end attached on the image reading device, and holds the image reading device opened with respect to the image forming device when another end of the holding member is inserted into the hole formed in the wall part. The holding member includes a first regulation part that comes into contact with a lower surface of the wall part to regulate detachment of the other end of the holding member from the hole.

13 Claims, 13 Drawing Sheets

IMAGE FORMING APPARATUS

BACKGROUND

Field

The present disclosure relates to an image forming apparatus which includes an image reading device that reads an image on a document.

Description of the Related Art

Conventionally, image forming apparatuses, such as multifunction apparatuses and facsimiles, include an image reading device for reading an image on a document on an image forming device for forming the image on a sheet. There is known an image forming apparatus having a configuration that enables rotation of an image reading device located on an image forming device with respect to the image forming device, for maintenance of an image forming unit inside the image forming device (Japanese Patent Application Laid-Open No. 2002-223335).

In addition, there has been proposed that such an image forming apparatus including an image reading device rotatably attached to an image forming device is provide with a holding member for holding the image reading device opened with respect to the image forming device during maintenance of the image forming device. Japanese Patent Application Laid-Open No. 2002-223335 discusses a configuration that holds the image reading device opened with respect to the image forming device by a rod-like holding member of which one end is rotatably provided on the image reading device and the other end is inserted into a hole formed in an upper surface of the image forming device. In the image forming apparatus having the foregoing configuration, a worker such as a serviceman can perform maintenance work on the image forming unit inside the image forming device while the image reading device is held opened with respect to the image forming device.

However, with this configuration according to Japanese Patent Application Laid-Open No. 2002-223335, the other end of the holding member, which is simply inserted into the hole formed in the image forming device, may be detached from the hole when the image reading device is rotated in a direction in which the image reading device is opened. Thus, for example, if the worker bumps into the image reading device by mistake while performing maintenance work, the other end of the holding member may be detached from the hole.

SUMMARY

The present disclosure is directed to providing an image forming apparatus capable of preventing a holding member that holds an image reading device opened with respect to an image forming device from being detached from a hole formed in the image forming device.

According to an aspect of the present disclosure, an image forming apparatus includes an image forming device that includes an image forming unit configured to form an image on a sheet, and a wall part in which a hole is formed, an image reading device configured to read an image on a document, wherein the image reading device is provided on the image forming device and further is configured to rotate around a rotation shaft to be operable and closable with respect to the image forming device, and a holding member that is rod-like and has one end attached on the image reading device, wherein the holding member is configured to hold the image reading device opened with respect to the image forming device when another end of the holding member is inserted into the hole formed in the wall part, wherein the holding member includes a first regulation part configured to come into contact with a lower surface of the wall part to regulate detachment of the other end of the holding member from the hole.

Further features of the present disclosure will become apparent from the following description of exemplary embodiments with reference to the attached drawings.

DESCRIPTION OF THE EMBODIMENTS

A first exemplary embodiment will be described below with reference to FIGS. 1 to 9. However, the first exemplary embodiment to be described below is an example embodying the present disclosure and does not limit the technical scope of the present disclosure.

Outline Configuration of Image Forming Apparatus

Figure 1:
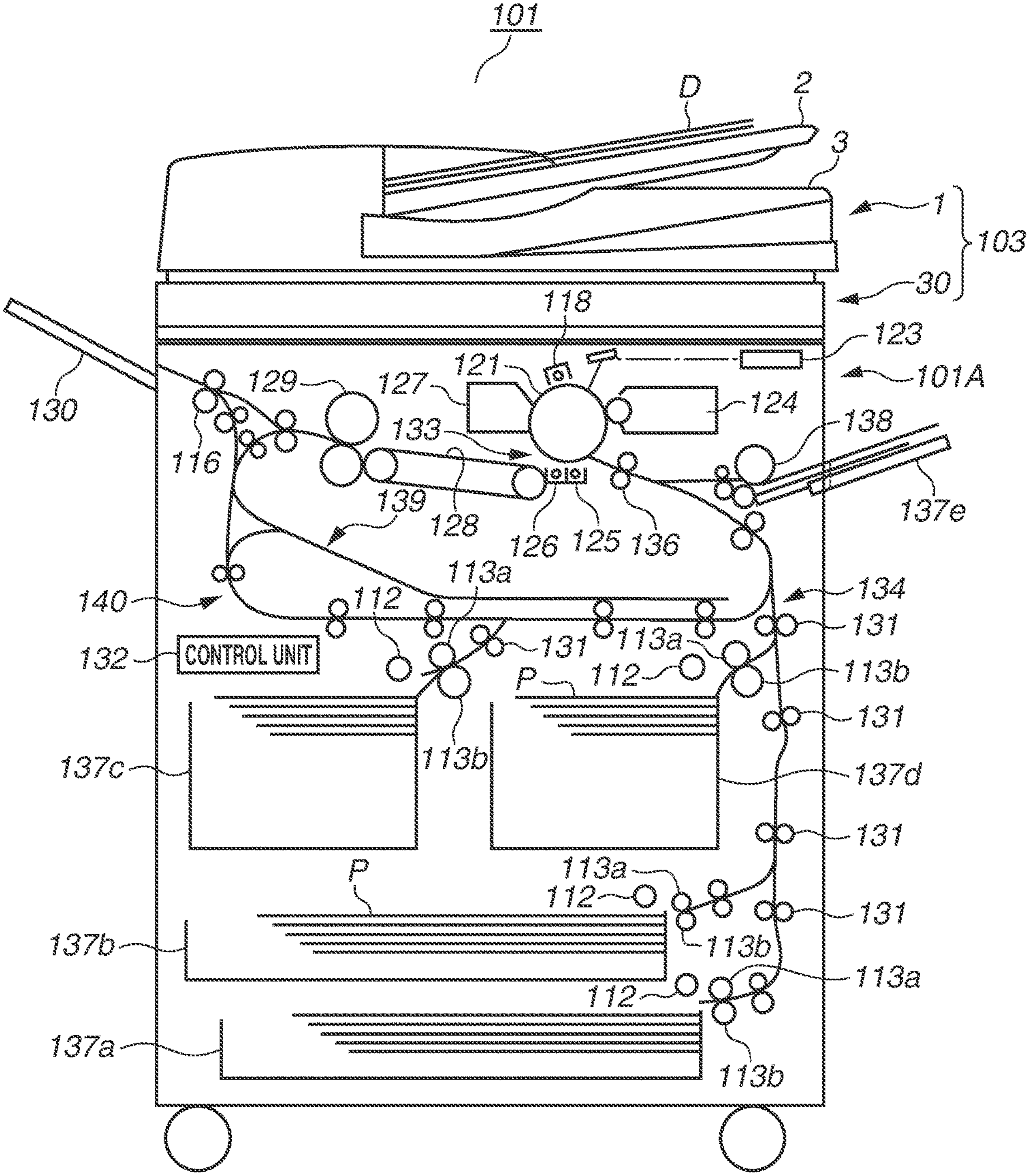
FIG. 1 is a schematic cross sectional view of an image forming apparatus according to a first exemplary embodiment.

First, a schematic configuration of an image forming apparatus 101 according to the present exemplary embodiment will be described with reference to FIG. 1. FIG. 1 is a schematic cross sectional view of the image forming apparatus 101. The image forming apparatus 101 is only an example of an image forming apparatus to which the present disclosure has been applied. A facsimile, an ink jet printer, a multifunction apparatus, or the like including an image reading apparatus is also applicable as the age forming apparatus 101 according to the present exemplary embodiment of the present disclosure.

As illustrated in FIG. 1, the image forming apparatus 101 includes an image reading apparatus 103 serving as an image reading device on an image forming apparatus main body 101A serving as an image forming device. The image reading apparatus 103 includes a reader 30 and an auto document feeder (ADF) 1 serving as a document conveyance unit. The image reading apparatus 103 reads image information by optically scanning documents D. The documents D are sheets, examples of which include paper such as paper sheets and envelopes, plastic films such as overhead projector sheets, and cloth. The image reading apparatus 103 converts the image information into electrical signals and transfers the electrical signals to a control unit 132 included in the image forming apparatus main body 101A.

The image forming apparatus main body 101A includes an image forming unit 133 for forming an image on a sheet P, i.e., a recording medium, and a sheet feed unit 134 for feeding a sheet P to the image forming unit 133. The sheet feed unit 134 includes sheet storage parts 137*a* to 137*d*, each of which can store a different size of sheets P. The sheets P stored in each sheet storage part are fed by a pick-up roller 112 and separated by a feed roller 113*a* and a retard roller 113*b* one by one, a separated sheet P is then transferred to a corresponding conveyance roller pair 131, after the sheet P is transferred, to a plurality of conveyance roller pairs 131 sequentially, which are disposed along a sheet conveyance path, the sheet P is conveyed to a registration roller pair 136.

A sheet P placed on a manual feed tray 137*e* by a user is fed to the inside of the image forming apparatus main body 101A by a feed roller 138 and is conveyed to the registration roller pair 136. The registration roller pair 136 stops the sheet P at the end thereof and corrects the skew of the sheet P. The registration roller pair 136 resumes the conveyance of the sheet P in accordance with the progress of an image forming operation, which is a toner image forming process performed by the image forming unit 133.

The image forming unit 133 is an electrophotographic-type image forming unit including a photosensitive drum 121, which is a photosensitive member. The photosensitive drum 121 is rotatable in the conveyance direction of the sheet P. A charging device 118, an exposure device 123, a development device 124, a transfer charging device 125, a separation charging device 126, and a cleaner 127 are disposed around the photosensitive drum 121. The charging device 118 uniformly electrically charges the surface of the photosensitive drum 121. The exposure device 123 exposes the photosensitive drum 121 based on the image information inputted from the image reading apparatus 103 to form an electrostatic latent image on the photosensitive drum 121. The development device 124 contains developer including toner and develops the electrostatic latent image to obtain a toner image by supplying the photosensitive drum 121 with electrically charged toner. The toner image on the photosensitive drum 121 is transferred to the sheet P conveyed from the registration roller pair 136 by the bias electric field formed by the transfer charging device 125. The sheet P onto which the toner image has been transferred is separated from the photosensitive drum 121 by the bias electric field formed by the separation charging device 126 and is conveyed to a fixing unit 129 by a pre-fixing conveyance part 128. The cleaner 127 removes substances adhered to the surface of the photosensitive drum 121, such as residual toner that has not been transferred to the sheet P and remaining on the photosensitive drum 121, and the photosensitive drum 121 stands by for the next image forming operation.

The sheet P conveyed to the fixing unit 129 undergoes fixing processing including pressing and heating of the toner image while being held and conveyed by a roller pair. Through this fixing processing, the toner is melted and fixed, and thus the image is fixed on the sheet P. When image output is completed, the sheet P on which the image is fixed is discharged to a discharge tray 130, which protrudes to the outside of the image forming apparatus main body 101A, via a discharge roller pair 116. If double-sided printing is performed to form an image on the back side of the sheet P, after the sheet P passes through the fixing unit 129, the sheet P is turned over by a reverse part 139 and is conveyed to the registration roller pair 136 by a double-sided punting conveyance part 140. Next, the sheet P of which the back side an image is formed by the image forming unit 133 is discharged to the discharge tray 130.

While the present exemplary embodiment illustrates a configuration in which an image forming unit and sheet storage parts are stored in a single housing as an example of the image forming apparatus main body 101A serving as an image forming device, the present exemplary embodiment is not limited to this example. For example, the present disclosure is applicable to a printer in which an image forming unit is stored in a housing and sheet storage parts are stored in another housing, and sheet conveyance paths of the housings are connected to each other. In this case, the printer performing steps from feeding of a sheet to discharging of the sheet is considered as an image forming device.

Outline Configuration of Image Reading Apparatus

Figure 2:
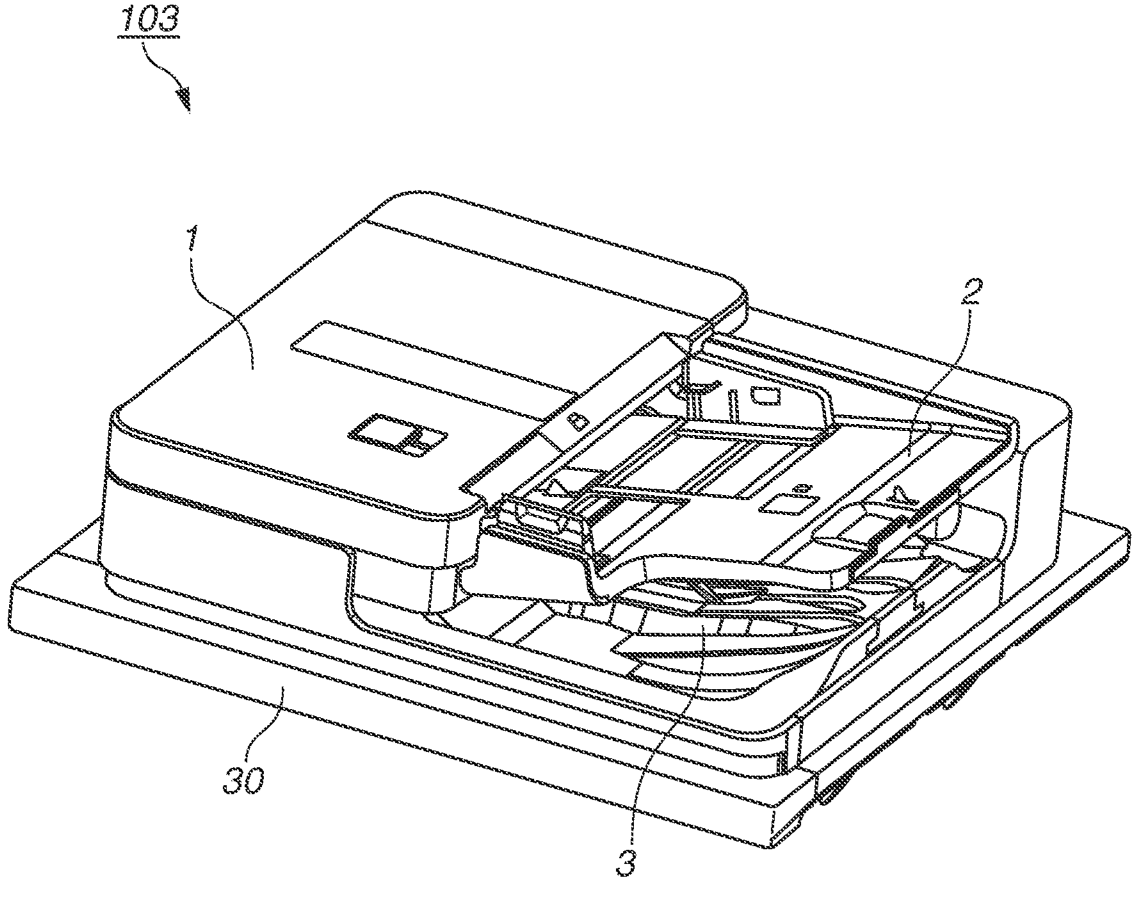
FIG. 2 is a perspective view of an image reading apparatus according to the first exemplary embodiment.
Figure 3:
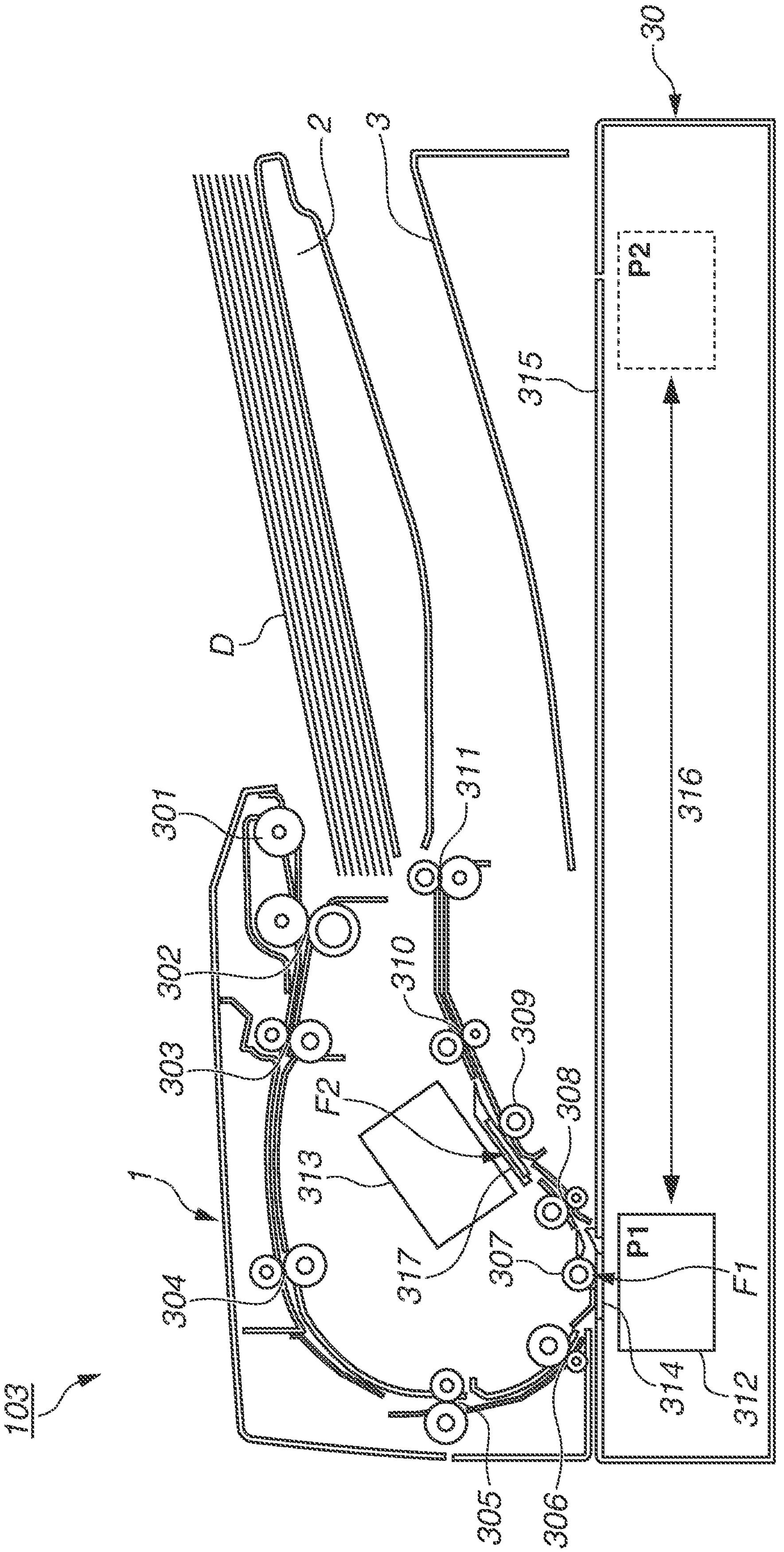
FIG. 3 is a schematic cross sectional view of the image reading apparatus according to the first exemplary embodiment.

Next, an outline configuration of the image reading apparatus 103 will be described with reference to FIGS. 2 and 3. FIGS. 2 and 3 are a perspective view and a schematic cross sectional view, respectively, of the image reading apparatus 103. As described above, the image reading apparatus 103 includes the reader 30 and the ADF 1. The ADF 1 conveys documents D placed on a document tray 2 serving as a document placement part to the reader 30 and discharges the documents D read by the reader 30 to a discharge tray 3.

The reader 30 is located on the image forming apparatus main body 101A, is rotated by a rotation mechanism, which will be described below, and is openable and closable with respect to the image forming apparatus main body 101A. The reader 30 includes a first reading unit 312 that reads an image on the front surface of a document D. In addition, a first flow reading glass plate 314 and a document platen glass plate 315, which are transparent members that transmit visible light, are formed on an upper surface of the reader 30. The document platen glass plate 315 and the first flow reading glass plate 314 are disposed side by side in a sub-scanning direction (along an arrow 316 in FIG. 3). When driven by a drive unit such as a drive belt not illustrated, the first reading unit 312 can move in the sub-scanning direction. The reader 30 reads an image on a document D placed on the document platen glass plate 315 by moving the first reading unit 312 in the sub-scanning direction. In addition, the first reading unit 312 reads an image on the front side of a document D conveyed by the ADF 1 at a first reading position F1. The sub-scanning direction according to the present exemplary embodiment is perpendicular to a main-scanning direction, which is the direction in which a plurality of light-receiving elements of the first reading unit 312 are arranged.

The ADF 1 includes a second reading unit 313 that reads an image on the back side of a document D. The second reading unit 313 reads an image on the back side of a document D conveyed by the ADF 1 at a second reading position F2 downstream of the first reading position F1 in the conveyance direction of the document D. The ADF 1 is supported rotatably with respect to the reader 30 by a hinge (not illustrated) provided on the back end side of the ADF 1 in FIG. 3 so that the document platen glass plate 315 is open. That is, when the ADF 1 is rotated upward and is opened, the user can place or remove a document D on the document platen glass plate 315. In addition, the ADF 1 is configured to press a document D on the document platen glass plate 315 by a resin plate (not illustrated) when the ADF 1 is closed, so that the document D will not move.

The ADF 1 includes the document tray 2 on which documents D are placed and the discharge tray 3 on which the documents D are discharged. The ADF 1 further includes a feed roller 301 for feeding the documents D placed on the document tray 2, a separation roller pair 302 for separating the documents D, one by one, and a first conveyance roller pair 303 for pulling the separated document D. The document D separated from the other documents by the separation roller pair 302 is sequentially conveyed by the first conveyance roller pair 303, a second conveyance roller pair 304, a third conveyance roller pair 305, a fourth conveyance roller pair 306, a fifth conveyance roller pair 308, and a sixth conveyance roller pair 310. A discharge roller pair 311 is disposed downstream of the sixth conveyance roller pair 310 in the conveyance direction. The discharge roller pair 311 discharges the document D of which the image has been read, onto the discharge tray 3.

The ADF 1 further includes a first platen roller 307 at a location that faces the first flow reading glass plate 314 between the fourth conveyance roller pair 306 and the fifth conveyance roller pair 308. The first platen roller 307 is a roller member that can prevent a document D from being lifted from the first flow reading glass plate 314 by coming into contact with the back side of the document D while rotating. In addition, the ADF 1 includes a second platen roller 309 at a location that faces a second flow reading glass plate 317 between the fifth conveyance roller pair 308 and the sixth conveyance roller pair 310. The second platen roller 309 is a roller member that can prevent rising of a document D from being lifted from the second flow reading glass plate 317 by coming into contact with the front side of the document D while rotating.

Next, an image reading operation performed by the image reading apparatus 103 will be described. The image reading apparatus 103 can perform an image reading operation either in a flow reading mode or in a fixed reading mode based on an explicit operation by the user. The flow reading mode is a mode in which an image on a document D is read by causing the ADF 1 to convey the document D to pass through the reading positions F1 and F2 of the first reading unit 312 and the second reading unit 313. The fixed reading mode is a mode in which an image on a document D placed on the document platen glass plate 315 by the user is read by causing the first reading unit 312 to move in the sub-scanning direction.

In the flow reading mode, the first reading unit 312 is fixed at a position P1 corresponding to the first reading position F1 and reads an image on a document D. The documents D placed on the document tray 2 are fed by the teed roller 301 and separated one by one at a separation nip part of the separation roller pair 302. The separated document D is pulled by the first conveyance roller pair 303 and reaches the first reading position F1 via the second conveyance roller pair 304, the third conveyance roller pair 305, and the fourth conveyance roller pair 306. Tt the first reading position F1, the first reading unit 312 optically scans the front side of the document D to read an image thereon.

After the document D passes through the first reading position F1, the document D reaches the second reading position F2 via the fifth conveyance roller pair 308. Tt the second reading position F2, the second reading unit 313 optically scans the back side of the document D to read an image thereon. After the document D passes through the second reading position F2, the document D is discharged onto the discharge tray 3 by the discharge roller pair 311 via the sixth conveyance roller pair 310. This reading operation is repeated until a sensor installed on the document tray 2 detects that all the documents have been fed. While the ADF 1 according to the present exemplary embodiment includes the second reading unit 313, which can read the back side of the document D, the ADF 1 may be configured not to include the second reading unit 313. In such a case where the ADF 1 does not include the second reading unit 313, after an image on the front side of the document D is read at the first reading position F1, the ADF 1 reverses the document D and conveys the reversed document D to the first reading position F1 again to read an image on the back side of the document.

Meanwhile, in the fixed reading mode, the first reading unit 312 scans a document D placed on the document platen glass plate 315 while reciprocating between the positions P1 and P2 in the sub-scanning direction to read an image on the document. The control unit 132 of the image forming apparatus main body 101A detects the position of the first reading unit 312 based on a position sensor not illustrated and the number of motor rotation pulses. In the fixed reading mode and the flow reading mode, the pieces of image information acquired by the first reading unit 312 and the second reading unit 313 are sequentially transferred to the control unit 132 of the image forming apparatus main body 101A.

While the image reading apparatus 103 according to the present exemplary embodiment includes the reader 30 and the ADF 1, the configuration of the image reading apparatus 103 is not limited to this example. For example, the image reading apparatus 103 may be configured to include only the reader 30 and a document pressing part for pressing a document placed on the document platen glass plate 315.

Configuration of Rotation of Image Reading Apparatus

Next, a configuration that enables rotation of the image reading apparatus 103 with respect to the image forming apparatus main body 101A will be described with reference to FIGS. 4 to 8. In FIGS. 4 to 8, the direction parallel to a rotation shaft line of the image reading apparatus 103 is a Y direction, the vertically upward direction is a Z direction, and the direction perpendicular to the Y direction and the Z direction is an X direction. That is, the X direction is a horizontal direction and a direction perpendicular to the rotation shaft line of the image reading apparatus 103. In addition, in FIGS. 4 to 8, illustration of the image forming apparatus main body 101A is simplified.

Figure 4A:
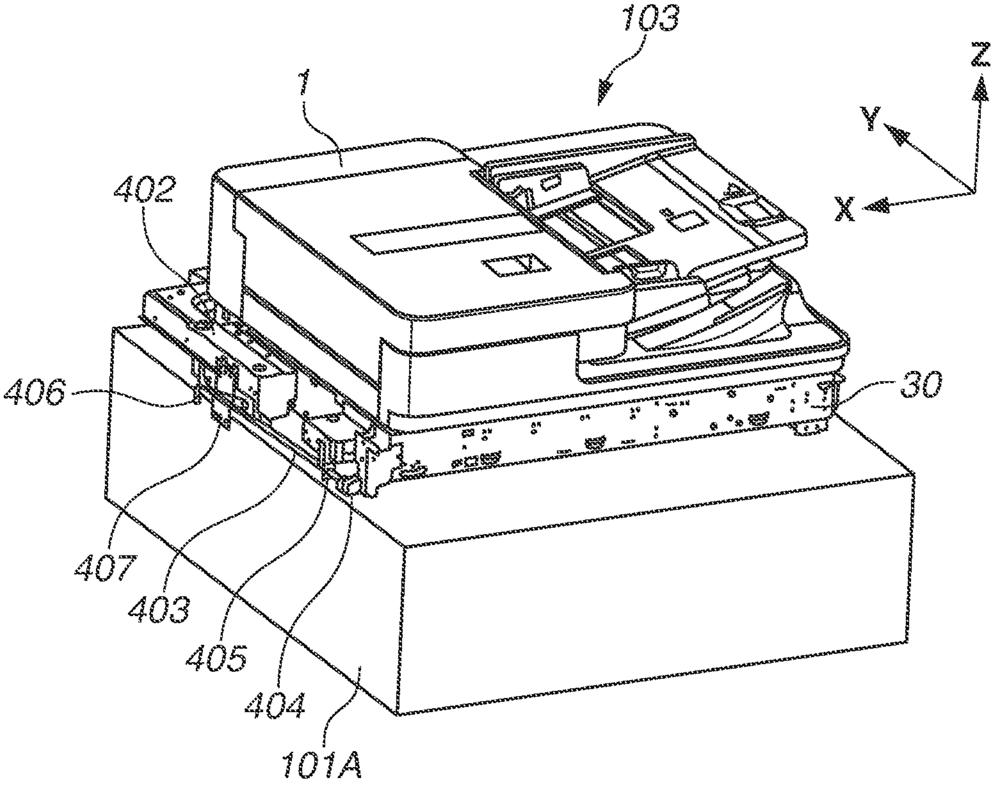
FIGS. 4A and 4B are a perspective view and a front view, respectively, illustrating the image reading apparatus closed with respect to an image forming apparatus main body.
Figure 4B:
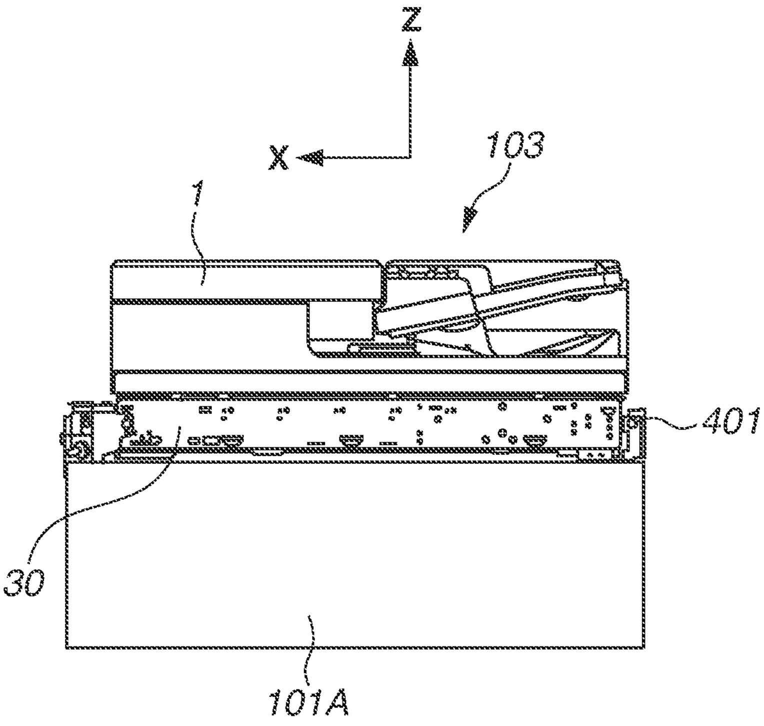

FIGS. 4A and 4B are a perspective view and a front view, respectively, illustrating the image reading apparatus 103 not rotated (closed) with respect to the image forming apparatus main body 101A. As illustrated in FIG. 4B, the image reading apparatus 103 includes a rotation shaft 401 on the right-side end thereof in the X direction to be rotatable with respect to the image forming apparatus main body 1014 about the rotation shaft 401 as the rotation center. The position of the rotation shaft 401 is not limited to the right-side end of the image reading apparatus 103 in the X direction. For example, the rotation shaft 401 may be located on the left-side end of the image reading apparatus 103 in the X direction or on the back end side of the image reading apparatus 103 in FIG. 4B.

The image reading apparatus 103 includes a handle 402 that a worker, e.g., a serviceman, holds when rotating the image reading apparatus 103, and a rod-like holding member 403 for holding the rotated posture of the image reading apparatus 103. This rotated posture is the posture of the image reading apparatus 103 when the image reading apparatus 103 is opened with respect to the image forming apparatus main body 101A. The holding member 403 has one end rotatable with respect to the image reading apparatus 103 and the other end having a tip member 404. In addition, the image reading apparatus 103 includes a wire 406 as a rotation regulation member for regulating the rotation angle of the image reading apparatus 103, and a clamp 405 for holding the holding member 403 at a position 704 corresponding to a storage state of the holding member 403 (see FIG. 7 to be described below). The entire length of the wire 406 is longer than that of the holding member 403. One end of the wire 406 is fixed to the image reading apparatus 103 and the other end of the wire 406 is fixed to the image forming apparatus main body 101A. In the present exemplary embodiment, these members are located on the left-side end in the X direction, that is, on the opposite side of the rotation shaft 401. However, the locations of these members are not limited to this example. For example, the holding member 403 and the wire 406 may be disposed near the center of the image reading apparatus 103 in the X direction.

As illustrated in FIG. 4A, when the image reading apparatus 103 is not rotated, the image reading apparatus 103 and the image forming apparatus main body 101A are fixed to each other by a fixing member 407. In this state, the image reading apparatus 103 cannot be rotated with respect to the image forming apparatus main body 101A. By releasing the fixing member 407 from the image reading apparatus 103, the worker can rotate the image reading apparatus 103.

Figure 5A:
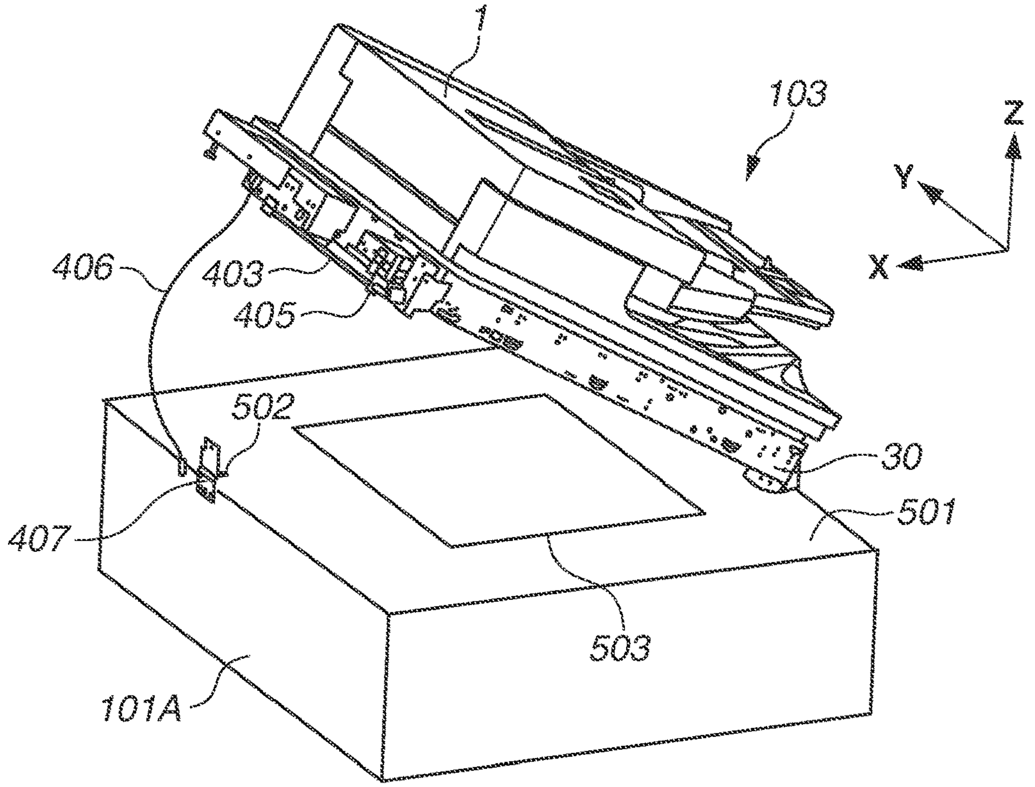
FIGS. 5A and 5B are a perspective view and a front view, respectively, illustrating the image reading apparatus rotated with respect to the image forming apparatus main body.
Figure 5B:
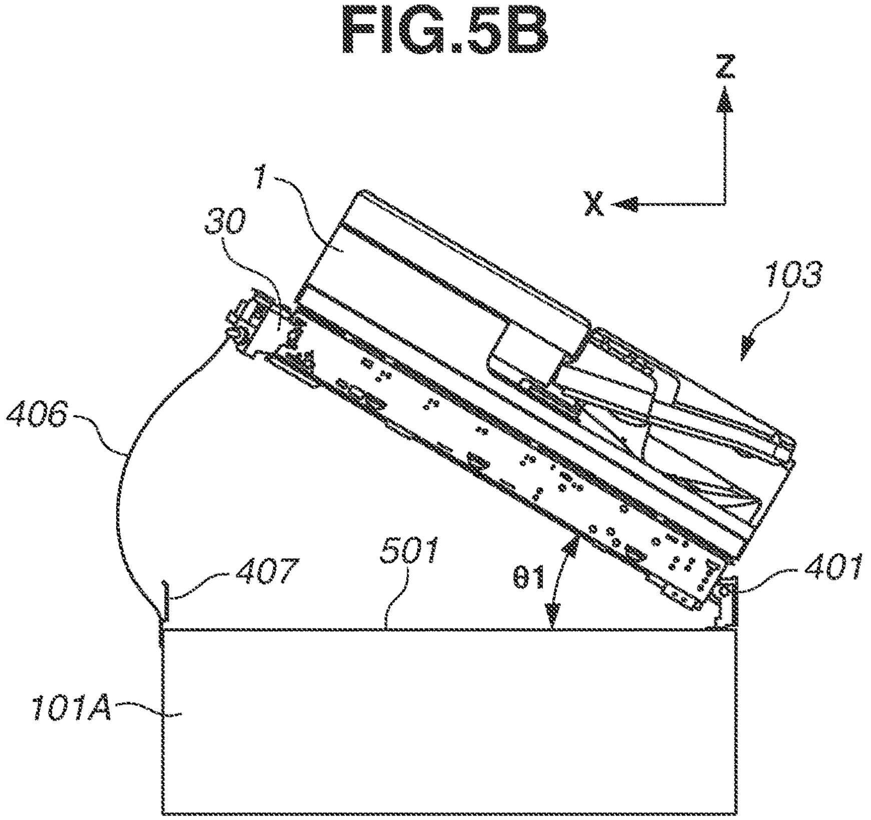

FIGS. 5A and 5B are a perspective view and a front view, respectively, illustrating the image reading apparatus 103 rotated (opened) with respect to the image forming apparatus main body 101A by an angle θ1. As illustrated in FIG. 5A, when the image reading apparatus 103 is rotated with respect to the image forming apparatus main body 101A, a top surface 501 of the image forming apparatus main body 101A is exposed to the outside of the apparatus. The top surface 501 has a detachable cover part 503. By detaching the cover part 503 from the top surface 501, the worker can access the image forming unit 133 inside the image forming apparatus main body 101A. That is, the worker performs maintenance work on the image forming unit 133 after rotating the image reading apparatus 103 and detaching the cover part 503 from the top surface 501. The top surface 501 serving as a wall part has a hole 502 into which the tip member 404 provided at a tip of the holding member 403 is inserted. Even when the image reading apparatus 103 is rotated, the holding member 403 is held at the position 704 corresponding to the storage state (see FIG. 7) by the clamp 405.

Figure 6A:
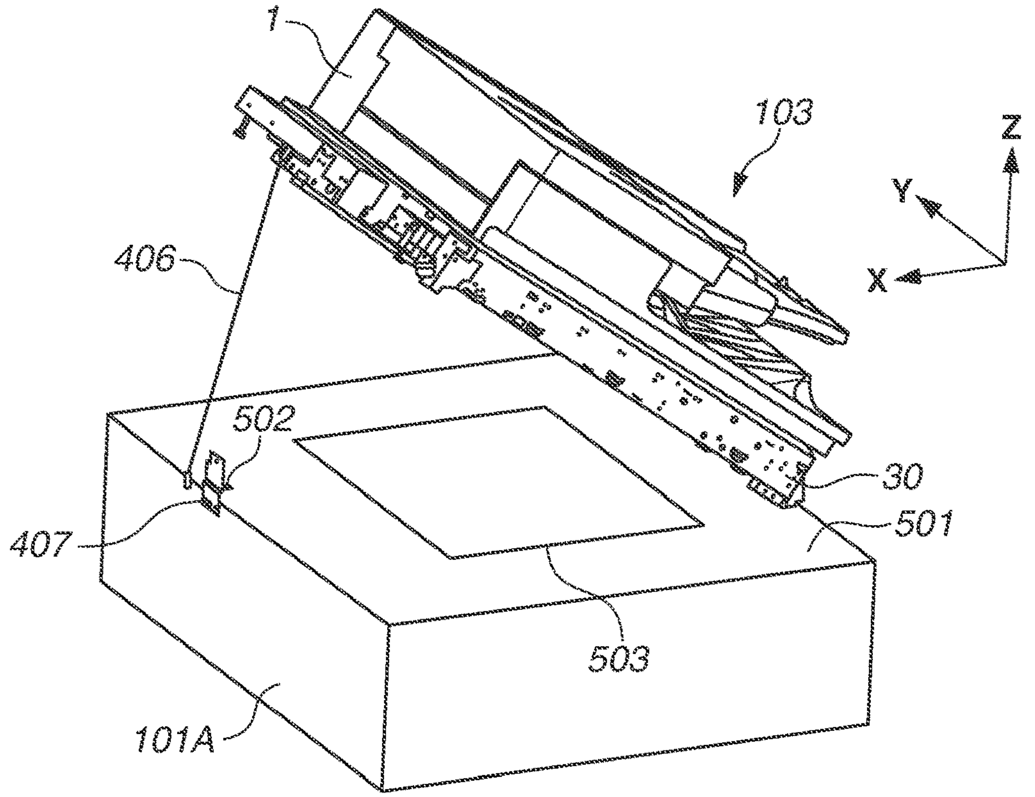
FIGS. 6A and 6B are a perspective view and a front view, respectively, illustrating the image reading apparatus rotated with respect to the image forming apparatus main body up to a maximum rotation angle.
Figure 6B:
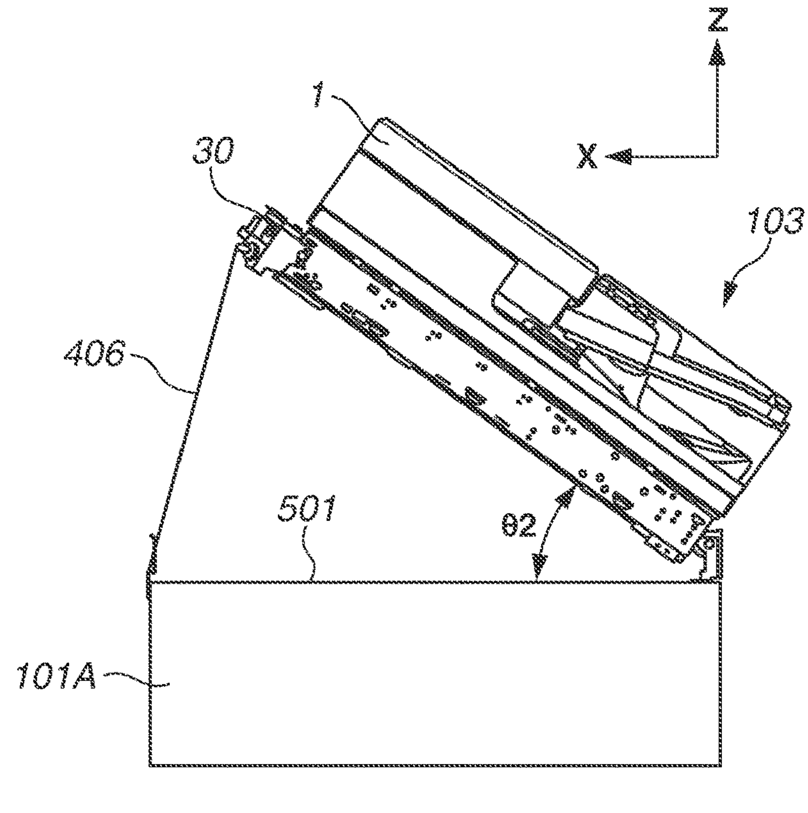

FIGS. 6A and 6B are a perspective view and a front view, respectively, illustrating the image reading apparatus 103 rotated with respect to the image forming apparatus main body 101A up to a maximum rotation angle θ2. As illustrated in FIG. 6A, when the image reading apparatus 103 is rotated up to the maximum rotation angle θ2 (a second angle), the wire 406 tightens. As a result, the image reading apparatus 103 coupled with the image forming apparatus main body 101A via the wire 406 cannot rotate more than the maximum rotation angle θ2. This wire 406 can prevent the image reading apparatus 103 from rotating to the opposite side (rotating by 180°) and prevent members around the rotation shaft 401 from being damaged, for example. In addition, if the image reading apparatus 103 is rotated by a much greater angle than the maximum rotation angle θ2, the ADF 1 may be opened with respect to the reader 30 without the worker's intention. According to the present exemplary embodiment, since the rotation angle of the image reading apparatus 103 is regulated by the wire 406, the ADF 1 is prevented from being opened with respect to the reader 30 without the worker's intention. According to the present exemplary embodiment, the maximum rotation angle θ2 is 35°. However, the maximum rotation angle θ2 may be set freely to any angle within the range of $0° < θ2 < 90°$ by changing the length of the wire 406.

Figure 7:
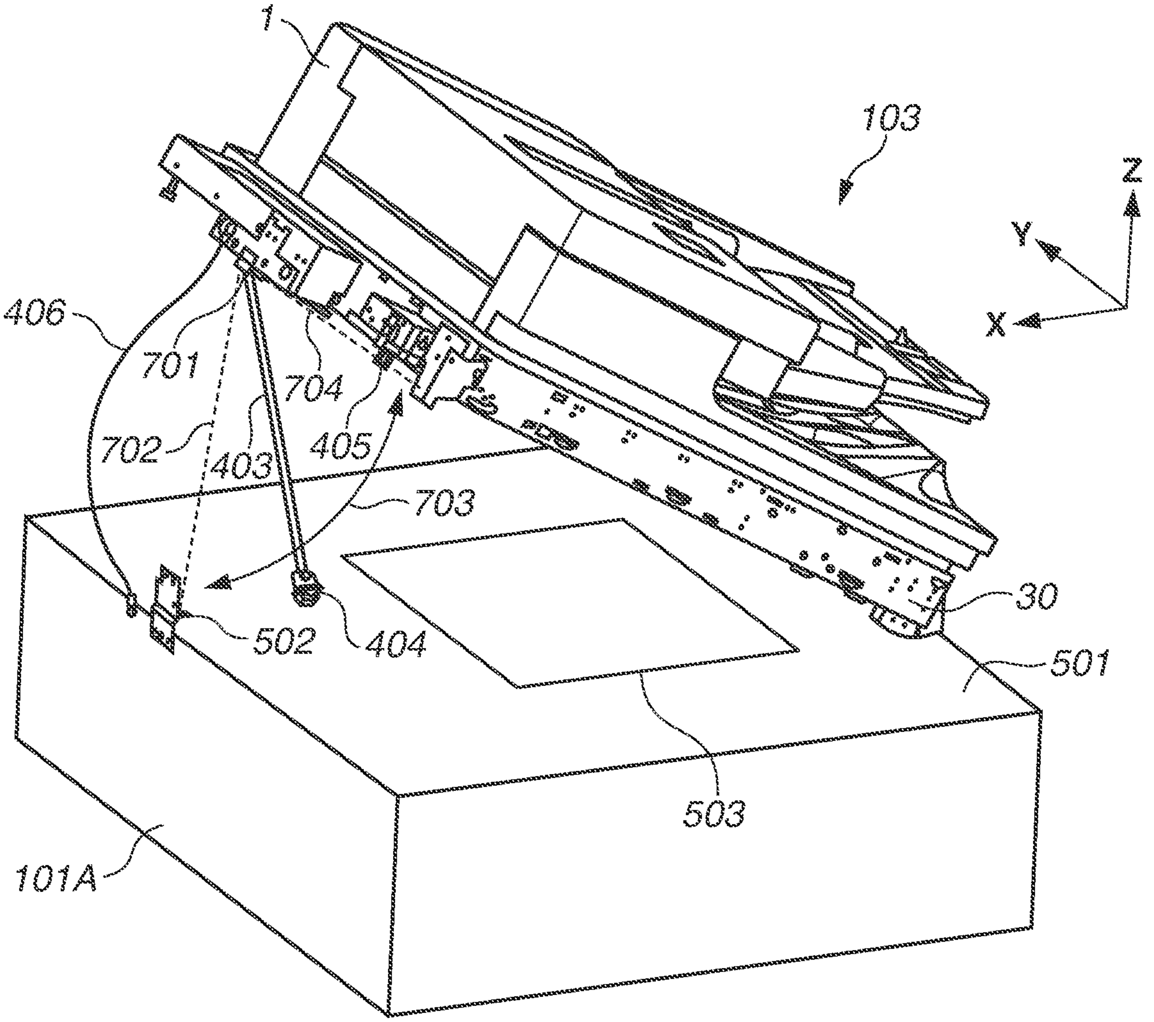
FIG. 7 illustrates a direction in which a holding member moves according to the first exemplary embodiment.
Figure 8A:
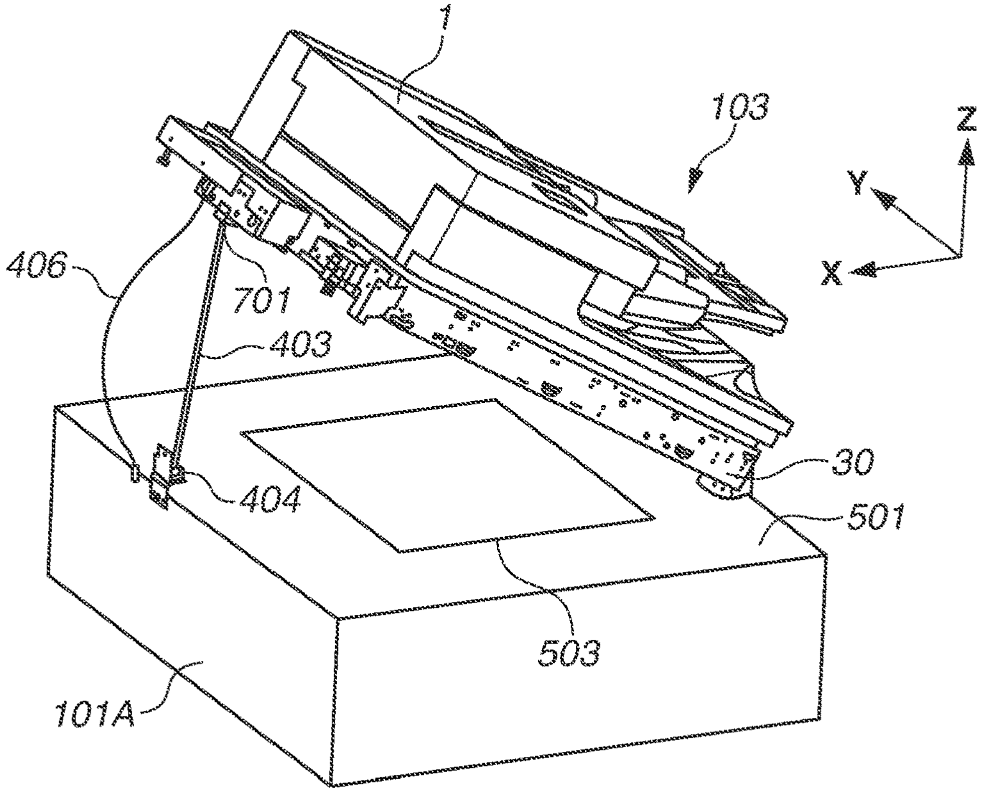
FIGS. 8A and 8B are a perspective view and a front view, respectively, illustrating the holding member holding a rotated posture of the image reading apparatus.
Figure 8B:
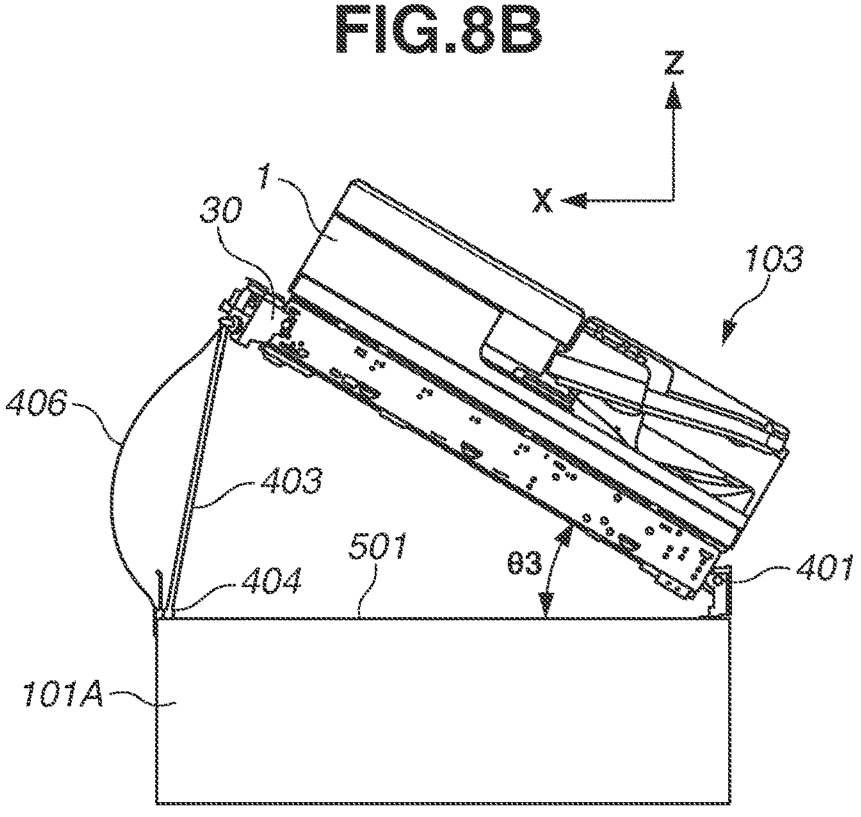

Next, how the rotated posture of the image reading apparatus 103 is held by the holding member 403 will be described with reference to FIGS. 7 and 8. FIG. 7 illustrates a direction (an arrow 703) in which the holding member 403 moves from the position 704 corresponding to the storage state to a position 702 corresponding to a usage state when the image reading apparatus 103 is opened with respect to the image forming apparatus main body 101A. The storage state of the holding member 403 is a state in which the holding member 403 is held by the clamp 405, and the usage state of the holding member 403 is a state in which the tip member 404 of the holding member 403 is inserted in the hole 502. In FIG. 7, the position 704 corresponding to the storage state of the holding member 403 and the position 702 corresponding to the usage state are indicated by dotted lines. FIGS. 8A and 8B are a perspective view and a front view, respectively, illustrating the holding member 403 holding the rotated posture of the image reading apparatus 103.

As illustrated in FIG. 7, when the image reading apparatus 103 is rotated with respect to the image forming apparatus main body 101A, the worker detaches the holding member 403 from the clamp 405, so that the holding member 403 can rotate in the direction indicated by the arrow 703. A shaft extending in the X direction is provided at a base part 701 of the holding member 403, and the shaft of the base part 701 is inserted into an elongated hole in the image reading apparatus 103. This shaft of the base part 701 rotatably supports the holding member 403 with respect to the image reading apparatus 103. Due to a gap between the shaft of the base part 701 and the elongated hole, the holding member 403 can be rotated not only in the direction indicated by the arrow 703 but also in the X direction. The worker moves the holding member 403 to the position 702 corresponding to the usage state and inserts the tip member 404 provided at the tip of the holding member 403 into the hole 502 formed in the top surface 501 of the image forming apparatus main body 101A. In this way, the image reading apparatus 103 is held opened with respect to the image forming apparatus main body 101A at an angle θ3 (a first angle). The second angle θ2 is larger than the first angle θ3. According to the present exemplary embodiment, the angle θ3 is 30°. However, the angle θ3 may be a different angle other than 30°. The angle θ3 may be set freely to any angle in the range of $0° < θ3 < θ2$ by changing the length of the holding member 403.

According to the present exemplary embodiment, the wire 406 is located on the back side of the base part 701 of the holding member 403 in the Y direction. That is, the wire 406 is disposed outside the movement region of the holding member 403 indicated by the arrow 703. By disposing the wire 406 at this position, when the worker moves the holding member 403, the wire 406 does not hinder the movement of the holding member 403. In addition, the worker rotates the image reading apparatus 103 by holding the handle 402 with one hand and moves the holding member 403 to the position 704 corresponding to the usage state with the other hand. Thus, it is preferable to adopt a configuration that enables the worker to attach and detach the holding member 403 to and from the clamp 405 through a one-touch operation.

Configuration of Holding Member

Figure 9:
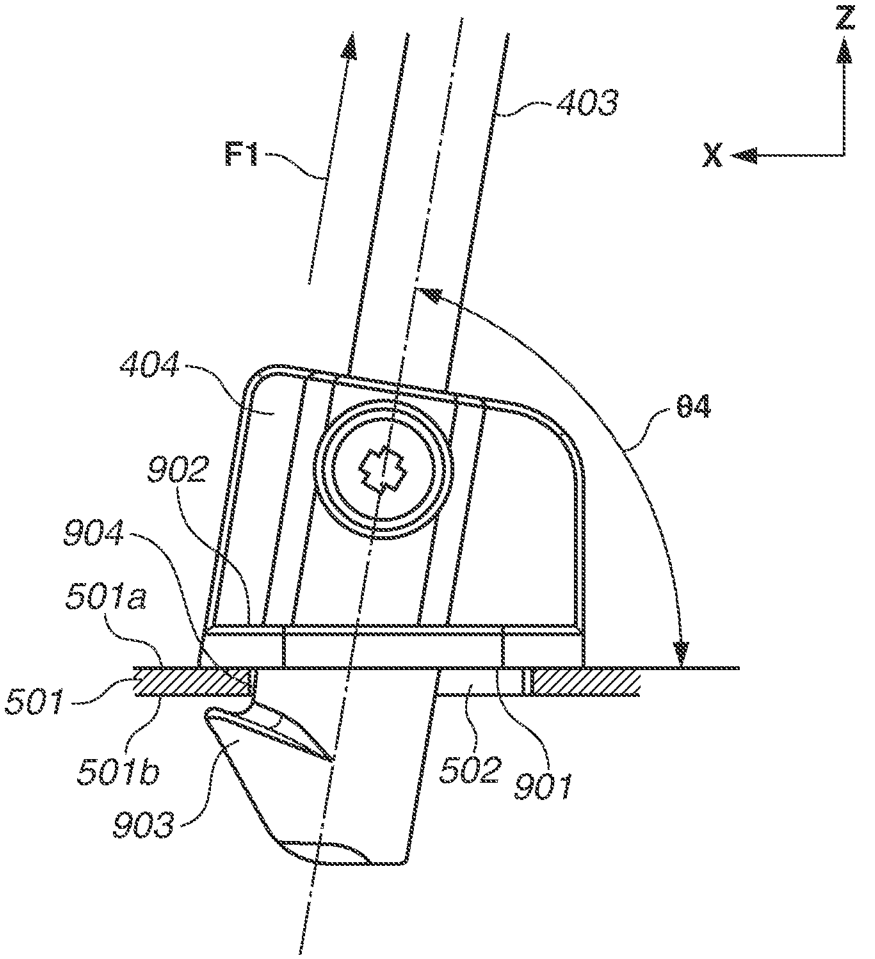
FIG. 9 is a front view illustrating a tip member of the holding member according to the first exemplary embodiment.

Next, a configuration of the tip member 404 of the holding member 403 according to the first exemplary embodiment will be described with reference to FIG. 9. FIG. 9 is a front view illustrating the tip member 404 of the holding member 403 that is inserted into the hole 502 formed in the top surface 501 of the image forming apparatus main body 101A. In FIG. 9, for ease of description, only the top surface 501 is illustrated in section. The tip member 404 has a supporting part 902 having a supporting surface 901 that comes into contact with an upper surface 501*a* of the top surface 501 to hold the rotated posture of the image reading apparatus 103. In addition, the tip member 404 has a protrusion part 903 as a first regulation part under the supporting part 902 in the Z direction. The protrusion part 903 protrudes in a direction perpendicular to the direction in which the holding member 403 extends. The protrusion part 903 is formed to protrude from the tip member 404 to the opposite direction of the rotation shaft 401 in the X direction (to the left side in the X direction). When the image reading apparatus 103 is raised upward, the protrusion part 903 comes into contact with a lower surface 501*b* of the top surface 501 and prevents the tip member 404 from being detached from the hole 502. The tip member 404 has a concave part 904 between the protrusion part 903 and the supporting surface 901 and is shaped in a hook. When the tip member 404 of the holding member 403 is inserted into the hole 502, the protrusion part 903 is positioned to sandwich the top surface 501 with the supporting surface 901, and the concave part 904 comes into contact with the top surface 501.

While the holding member 403 is holding the rotated posture of the image reading apparatus 103, the holding member 403 is slanted such that an angle θ4 between the holding member 403 and the top surface 501 on the rotation shaft 401 side (the right side in the X direction) seen from the Y direction is a sharp angle ($0° < θ4 < 90°$). In addition, according to the present exemplary embodiment, the tip member 404 is made from polyacetal (POM), which is a resin material having a sliding property. In this way, when the weight of the image reading apparatus 103 is applied to the tip member 404, the tip member 404 slides in the opposite direction of the rotation shaft 401 when seen from the Y direction (the left side in the X direction), and the concave part 904 is pressed against the inner edge of the hole 502. That is, the tip member 404 moves along the top surface 501 due to the weight of the image reading apparatus 103, and the inner edge of the hole 502 holds the tip member 404. In this way, the holding member 403 can stably support the image reading apparatus 103. The material of the tip member 404 is not limited to the above example, and may be a different material such as a polytetrafluoroethylene (PTFE) resin, which is a fluorine resin, or a sintered material on which an oil impregnation process has been performed. Alternatively, the holding member 403 may be configured not to include the tip member 404. The holding member 403 may be formed integrally with the protrusion part 903 in such a case.

According to the present exemplary embodiment, the tip member 404 formed at the holding member 403 has the protrusion part 903. In this way, even in a case where the worker bumps into the image reading apparatus 103 or the holding member 403 by mistake and instantaneous force F1 is then applied in the direction in which the holding member 403 is detached from the hole 502, the protrusion part 903 comes into contact with the lower surface 501*b* of the top surface 501, so that the tip member 404 is prevented from being detached from the hole 502.

To detach the tip member 404 from the hole 502, the worker moves the tip member 404 in the direction opposite to the protruding direction of the protrusion part 903 (the right side in the X direction in FIG. 9) and lifts up the image reading apparatus 103. In this way, the worker can detach the tip member 404 from the hole 502 when the protrusion part 903 is not in contact with the lower surface 501*b* of the top surface 501.

According to the present exemplary embodiment, the protrusion part 903 as the first regulation part is formed to protrude from the tip member 404 to the left side in the X direction as illustrated in FIG. 9. However, the protruding direction of the protrusion part 903 is not limited to this example. For example, the protrusion part 903 may be formed to protrude from the tip member 404 to the back side in the Y direction. In addition, the tip member 404 according to the present exemplary embodiment has the supporting part 902 that comes into contact with the upper surface 501*a* of the top surface 501 of the image forming apparatus main body 101A to support the image reading apparatus 103. However, the tip member 404 may not include the supporting part 902. In this case, the tip member 404 supports the image reading apparatus 103 in such a manner that an end of the tip member 404 comes into contact with a supporting surface (not illustrated) located under the hole 502 of the image forming apparatus main body 101A.

Next, a second exemplary embodiment will be described with reference to FIGS. 10 and 11. The second exemplary embodiment is also an example embodying the present disclosure and does not limit the technical scope of the present disclosure. According to the first exemplary embodiment, the tip member 404 has the protrusion part 903. The tip member 404 according to the second exemplary embodiment has a protrusion part 905 in addition to a protrusion part 903. However, since the second exemplary embodiment is the same as the first exemplary embodiment other than the configuration of the tip member 404 of the holding member 403, redundant description thereof will be avoided.

Configuration of Holding Member

Figure 10B:
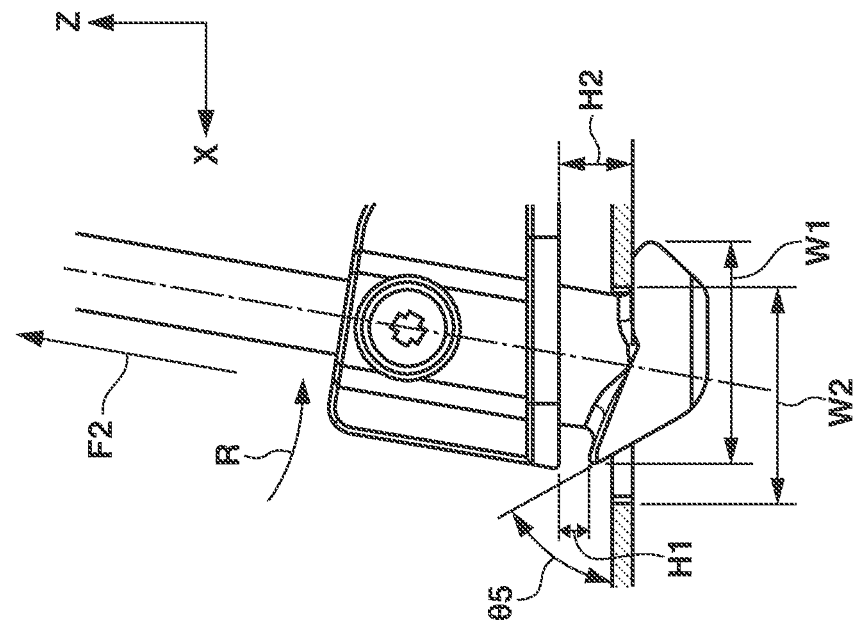
FIGS. 10A and 10B are each a front view illustrating a tip member of a holding member according to a second exemplary embodiment.
Figure 10A:
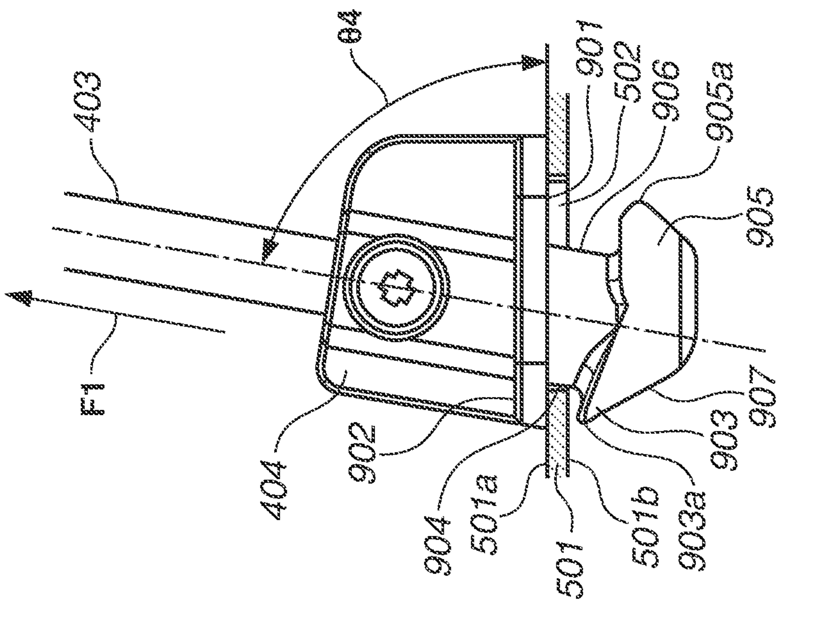

FIGS. 10A and 10B are each front views illustrating the tip member 404 of the holding member 403 inserted into the hole 502 formed in the top surface 501 of the image forming apparatus main body 101A. More specifically, FIG. 10A illustrates the holding member 403 when instantaneous external force F1 is applied thereto, and FIG. 10B illustrates the holding member 403 when external force F2 is slowly applied thereto as the image reading apparatus 103 is lifted up slowly. According to the second exemplary embodiment, as illustrated in FIG. 10A, the tip member 404 has the protrusion part 905 in addition to the protrusion part 903 described in the first exemplary embodiment. The protrusion part 905 is formed to protrude from the tip member 404 on the rotation shaft 401 side in the X direction (the right side in the X direction). The tip member 404 has a concave part 906 between the protrusion part 905 and the supporting surface 901 and is shaped in a hook.

As illustrated in FIG. 10B, if a gap between the protrusion part 903 and the supporting surface 901 (the width of a concave part 904) is H1 and a gap between the protrusion part 905 and the supporting surface 901 (the width of the concave part 906) is H2, the gap H2 is larger than the gap H1 (H1<H2). In addition, if a width between a tip part 903*a* of the protrusion part 903 and a tip part 905*a* of the protrusion part 905 is W1 and the width of the hole 502 in the X direction is W2, the width W1 is larger than the width W2 (W1>W2). This prevents the tip member 404 from being easily detached from the hole 502. To allow attachment and detachment of the tip member 404 into and from the hole 502, the protrusion part 903 has a slope 907 such that a right-side angle θ5 in the X direction with respect to the top surface 501 is a sharp angle (0°<θ5<90°) when the tip member 404 is inserted into the hole 502. An operation of detaching the tip member 404 from the hole 502 will be described below.

As illustrated in FIG. 10A, when the instantaneous force F1 is applied to the holding member 403, the protrusion part 903 comes into contact with the lower surface 501*b* of the top surface 501, so that the tip member 404 is prevented from being detached from the hole 502, as in the first exemplary embodiment. In addition, as illustrated in FIG. 10B, when the image reading apparatus 103 is slowly lifted up and the force F2 is slowly applied to the holding member 403, the holding member 403 moves like a pendulum due to the weight of the image reading apparatus 103 in the direction indicated by an arrow R. Since H1<H2, when the holding member 403 moves in the direction indicated by the arrow R, the concave part 906 comes into contact with the inner edge of the hole 502 as illustrated in FIG. 10B. Thus, even when the force F2 is slowly applied in the direction in which the holding member 403 is detached, the protrusion part 905 comes into contact with the lower surface 501*b* of the top surface 501, so that the tip member 404 is prevented from being detached from the hole 502.

Operation of Detaching Tip Member from Hole

Next, an operation of detaching the tip member 404 inserted into the hole 502 from the hole 502 will be described with reference to FIG. 11. FIGS. 11A to 11D illustrate an operation of detaching the tip member 404 from the hole 502.

Figure 11A:
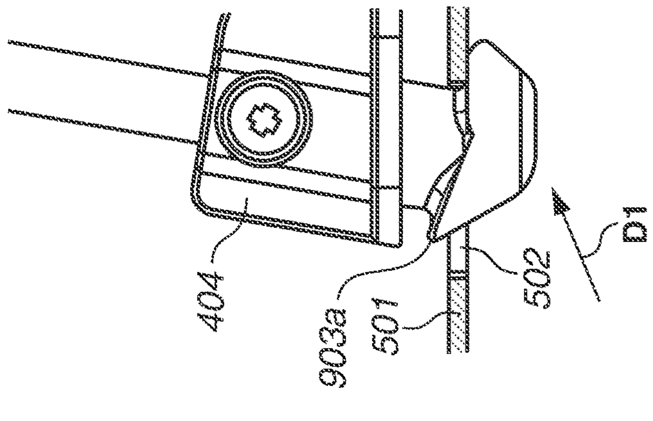
FIGS. 11A to 11D illustrate an operation of detaching the tip member from a hole according to the second exemplary embodiment.
Figure 11B:
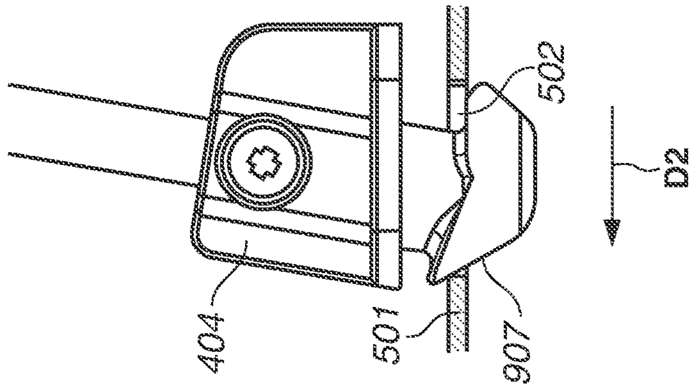
Figure 11C:
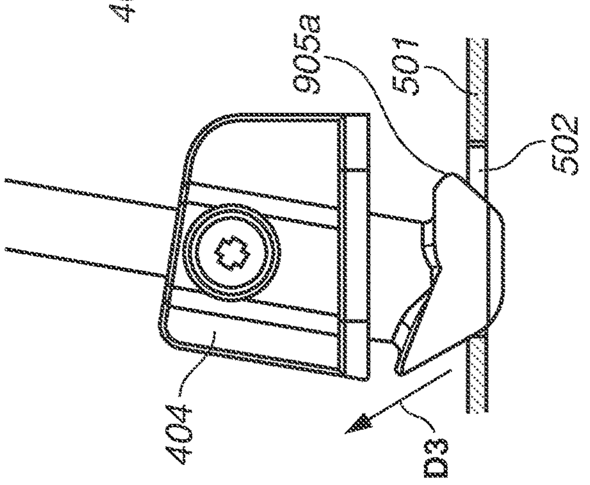
Figure 11D:
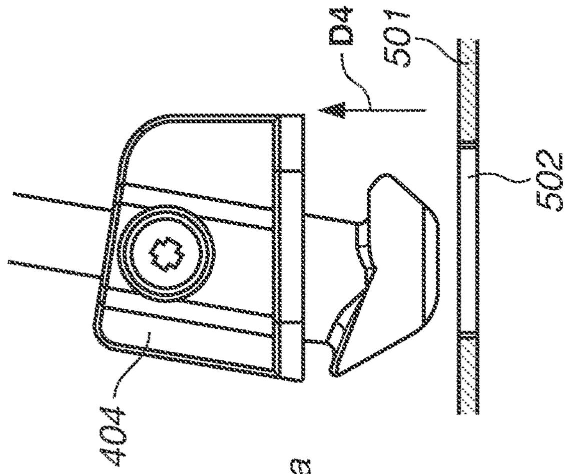

First, when the tip member 404 is inserted into the hole 502 and the weight of the image reading apparatus 103 is applied to the holding member 403, the tip member 404 is located as illustrated FIG. 10A. In this state, a worker holds the handle 402 and slightly rotates the image reading apparatus 103. Consequently, as described above, the tip member 404 moves to the position where the protrusion part 905 comes into contact with the lower surface 501*b* of the top surface 501 (the state illustrated in FIG. 11A). At this time the tip member 404 moves in the direction is indicated by an arrow D1, and the tip part 903*a* of the protrusion part 903 of the tip member 404 is located above the hole 502. In this state, the worker moves the tip member 404 in the direction indicated by an arrow D2 illustrated in FIG. 11B by holding the holding member 403. Consequently, the left-side inner edge of the hole 502 comes into contact with the slope 907 of the protrusion part 903 of the tip member 404. In this state, the worker then moves the tip member 404 in the direction indicated by an arrow D3 along the slope as illustrated in FIG. 11C. Thereafter the worker can detach the tip member 404 from the hole 502 by moving the tip member 404 in the direction indicated by an arrow D4 as illustrated in FIG. 11D, i.e., in the Z direction.

As described above, according to the second exemplary embodiment, the tip member 404 of the holding member 403 has the protrusion part 903 and the protrusion part 905. Since the protrusion part 903 and the protrusion part 905 come into contact with the lower surface 501*b* of the top surface 501, the tip member 404 is prevented from being detached from the hole 502.

Since the image reading apparatus 103 includes a drive unit for conveying documents, the image reading apparatus 103 is heavy. According to the first and second exemplary embodiments, the holding member 403 is provided in the image reading apparatus 103, and the tip member 404 of the holding member 403 is inserted into the hole 502 formed in the image forming apparatus main body 101A. With this configuration, the worker does not need to look into the hole 502 from below. Even in a case where the image reading apparatus 103 is heavy, the worker can easily insert the holding member 403 into the hole 502.

Next, a third exemplary embodiment will be described with reference to FIGS. 12 and 13. The third exemplary embodiment is also an example embodying the present disclosure and does not limit the technical scope of the present disclosure. According to the first and second exemplary embodiments, one end of the holding member 403 is rotatably provided in the image reading apparatus 103, and the tip member 404 formed at the other end of the holding member 403 is inserted into the hole 502 formed in the top surface 501 of the image forming apparatus main body 101A. According to the third exemplary embodiment, one end of a holding member 403 is rotatably provided in the image forming apparatus main body 101A, and a tip member 404 formed at the other end of the holding member 403 is inserted into a hole 32 formed in a lower part of the image reading apparatus 103. However, since the third exemplary embodiment is the same as the first exemplary embodiment except for the holding member 403 and the hole 32 of the image forming apparatus 101, redundant description will be avoided.

Configuration of Holding Member

Figure 12:
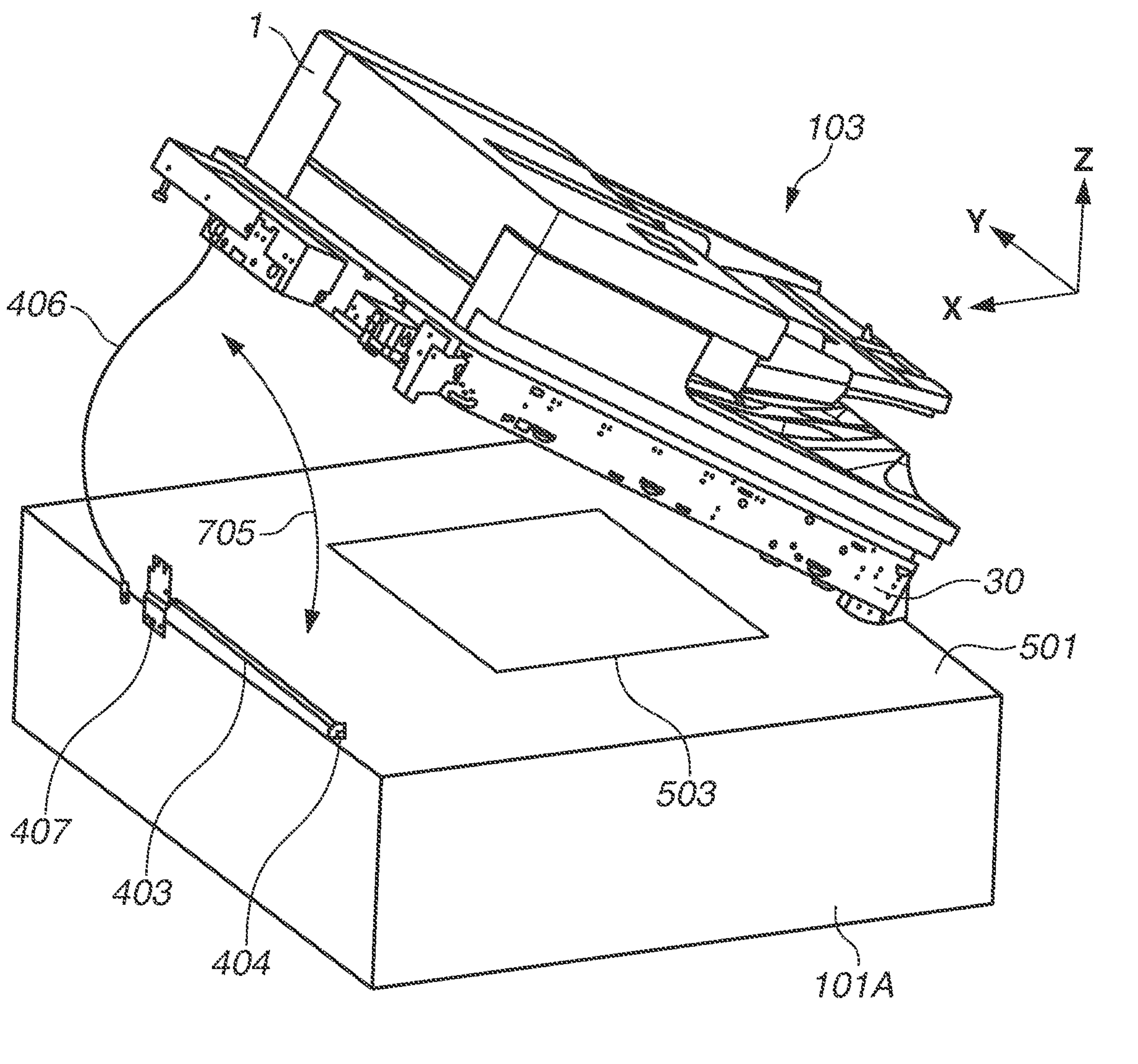
FIG. 12 illustrates a direction in which a holding member moves according to a third exemplary embodiment.

FIG. 12 illustrates a direction (an arrow 705) in which the holding member 403 is rotated when the image reading apparatus 103 is opened with respect to the image forming apparatus main body 101A. According to the third exemplary embodiment, as illustrated in FIG. 12, one end of the holding member 403 is rotatably provided in the top surface 501 of the image forming apparatus main body 101A, and the tip member 404 described in the first exemplary embodiment is formed at the other end of the holding member 403. When the image reading apparatus 103 is opened with respect to the image forming apparatus main body 101A, the worker moves the holding member 403 in the direction indicated by the arrow 705 and inserts the tip member 404 into the hole 32 formed in a bottom surface 31 (a wall part according to the present exemplary embodiment) of the image reading apparatus 103. In this way, the image reading apparatus 103 is held opened with respect to the image forming apparatus main body 101A.

Figure 13:
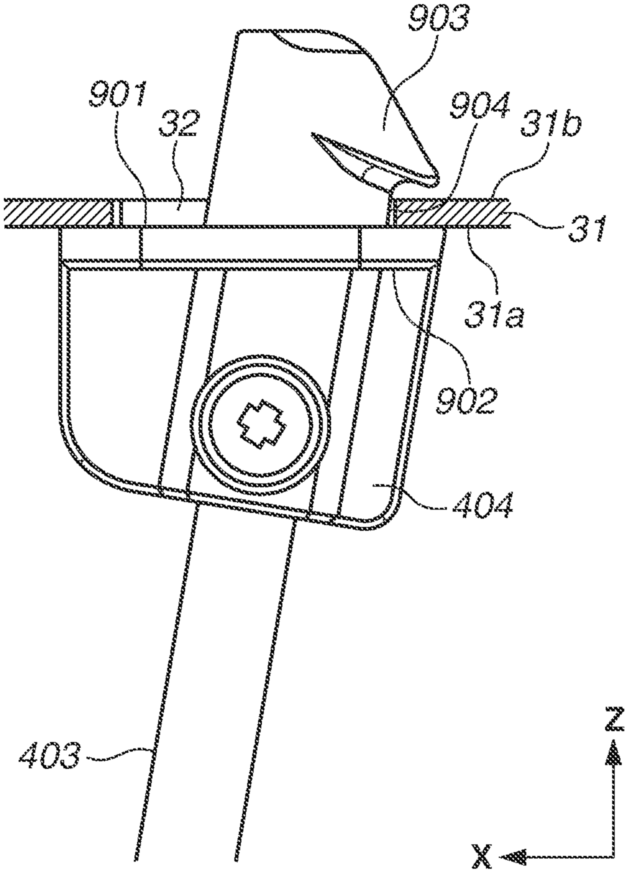
FIG. 13 is a front view illustrating a tip member of the holding member according to the third exemplary embodiment.

FIG. 13 is a front view illustrating the tip member 404 of the holding member 403, the tip member 404 inserted into the hole 32 formed in the bottom surface 31 of the image reading apparatus 103. The tip member 404 is provided with a supporting part 902 having a supporting surface 901 for holding the rotated posture of the image reading apparatus 103 by coming into contact with a lower surface 31*a* of the bottom surface 31. In addition, the tip member 404 has a protrusion part 903 above the supporting part 902 in the Z direction. The protrusion part 903 according to the present exemplary embodiment is formed to protrude from the tip member 404 on the rotation shall 401 side in the X direction (the right side in the X direction). When the image reading apparatus 103 is lifted upward, the protrusion part 903 comes into contact with an upper surface 31*b* of the bottom surface 31, and the tip member 404 is prevented from being detached from the hole 32. The tip member 404 has a concave part 904 between the protrusion part 903 and the supporting surface 901 and is shaped in a hook. When the tip member 404 of the holding member 403 is inserted into the hole 32, the protrusion part 903 is positioned to sandwich the bottom surface 31 with the supporting surface 901, and the concave part 904 comes into contact with the bottom surface 31.

With the above configuration according to the third exemplary embodiment, even when the worker bumps into the image reading apparatus 103 by mistake and the instantaneous force F1 is applied in the Z direction, the protrusion part 903 comes into contact with the upper surface 31*b* of the bottom surface 31, and thus the tip member 404 is prevented from being detached from the hole 32.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-187420, filed Nov. 10, 2020, which is hereby incorporated by reference herein in its entirety.

What is claimed is:

1. An image forming apparatus comprising:

an image forming device that includes an image forming unit configured to form an image on a sheet, and a wall part in which a hole is formed;

an image reading device configured to read an image on a document, wherein the image reading device is provided on the image forming device and further is configured to rotate around a rotation shaft to be openable and closable with respect to the image forming device; and a holding member that is rod-like and has one end attached on the image reading device, wherein the holding member is configured to hold the image reading device opened with respect to the image forming device when another end of the holding member is inserted into the hole formed in the wall part, wherein the holding member includes a first regulation part configured to come into contact with a lower surface of the wall part to regulate detachment of the other end of the holding member from the hole.

2. The image forming apparatus according to claim 1, wherein the holding member further includes a supporting part configured to support the image reading device by coming into contact with an upper surface of the wall part when the other end of the holding member is inserted into the hole.

3. The image forming apparatus according to claim 2, wherein the first regulation part protrudes from the other end of the holding member in a direction perpendicular to a longitudinal direction of the holding member, wherein the holding member has a concave part between the supporting part and the first regulation part in the longitudinal direction, and wherein, in a state where the holding member is holding the image reading device opened with respect to the image forming device, the concave part is pressed against an inner edge of the hole by a weight of the image reading device.

4. The image forming apparatus according to claim 1, wherein the first regulation part protrudes from the other end of the holding member in a direction perpendicular to a longitudinal direction of the holding member.

5. The image forming apparatus according to claim 1, wherein the first regulation part protrudes toward an opposite side of the rotation shaft in a horizontal direction and in a direction perpendicular with respect to the rotation shaft of the image reading device.

6. The image forming apparatus according to claim 5, wherein the holding member further includes a second regulation part configured to come into contact with the lower surface of the wall part to regulate detachment of the other end of the holding member from the hole, and wherein the second regulation part is formed to protrude toward the rotation shaft in the horizontal direction and in the direction perpendicular with respect to the rotation shaft of the image reading device.

7. The image forming apparatus according to claim 6, wherein the holding member further includes a supporting part configured to support, the image reading device by coming into contact with an upper surface of the wall part, and wherein a gap between the second regulation part, and the supporting part is larger than a gap between the first regulation part and the supporting part.

8. The image forming apparatus according to claim 6, wherein a width from an end of the first regulation part to an end of the second regulation part is larger than a width of the hole in the horizontal direction and the direction perpendicular with respect to the rotation shaft of the image reading device.

9. The image forming apparatus according to claim 1, wherein the holding member is slanted such that an angle between the holding member and an upper surface of the wall part on the rotation shaft side is a sharp angle when seen from a direction parallel to the rotation shaft of the image reading device in a state where the holding member is holding the image reading device opened with respect to the image forming device.

10. The image forming apparatus according to claim 1, wherein the image reading device further includes a reader and a document conveyance unit, wherein the reader includes a platen on which the document is to be placed and reads the image on the document placed on the platen, and wherein the document conveyance unit is provided on the reader to be rotatable with respect to the reader and includes a document placement part configured to convey a document placed on the document placement part to the reader.

11. The image forming apparatus according to claim 1, wherein the holding member is configured to hold the image reading device in a state where the image reading device is rotated with respect to the image forming device by a first angle, and wherein the holding member includes a rotation regulation member configured to regulate the image reading device from rotating by a second angle or more with respect to the image forming apparatus, where the second angle is larger than the first angle.

12. The image forming apparatus according to claim 1, further comprising a fixing member configured to fix the image reading device so that the image reading device is prevented from rotating with respect to the image forming device in a state where the image reading device is closed with respect to the image forming device.

13. An image forming apparatus comprising:

an image forming device that includes an image forming unit configured to form an image on a sheet;

an image reading device configured to read an image on a document, wherein the image reading device (i) includes a wall part in which a hole is formed, (ii) is provided on the image forming device, and (iii) further is configured to rotate around a rotation shaft to be openable and closable with respect to the image forming device; and a holding member that is rod-like and has one end attached on the image forming device, wherein the holding member is configured to hold the image reading device opened with respect to the image forming device when another end of the holding member is inserted into the hole formed in the wall part, wherein the holding member includes a first regulation part configured to come into contact with an upper surface of the wall part to regulate detachment of the other end of the holding member from the hole.

* * * * *